United States Patent [19]

Koie

[11] Patent Number: 5,646,639
[45] Date of Patent: Jul. 8, 1997

[54] DISPLAY DEVICE FOR VEHICLES

[75] Inventor: Kazutoshi Koie, Tokoname, Japan

[73] Assignee: Nippondenso Co., Ltd., Kariya, Japan

[21] Appl. No.: 468,978

[22] Filed: Jun. 6, 1995

[30]     Foreign Application Priority Data

Jun. 13, 1994  [JP]  Japan ................................ 6-130544
Jun. 13, 1994  [JP]  Japan ................................ 6-130545

[51] Int. Cl.$^6$ ................................................ G09G 5/00
[52] U.S. Cl. ............................ 345/7; 359/630; 340/980
[58] Field of Search ........................ 345/7, 8, 9; 359/630, 359/631, 632, 13, 14, 633; 340/980, 461, 525; 348/115, 118, 121

[56]         References Cited

U.S. PATENT DOCUMENTS

| 4,711,544 | 12/1987 | Iino et al. | 345/7 |
| 4,831,366 | 5/1989 | Iino | 345/7 |

FOREIGN PATENT DOCUMENTS

| 60-183240 | 9/1985 | Japan . | |
| 61-249849 | 11/1986 | Japan . | |
| 63-182935 | 11/1988 | Japan . | |
| 233733 | 3/1990 | Japan . | |
| 585222 | 4/1993 | Japan . | |
| 2269681 | 2/1994 | United Kingdom | 345/7 |

*Primary Examiner*—Dennis Chow
*Attorney, Agent, or Firm*—Cushman, Darby & Cushman IP Group of Pillsbury Madison & Sutro LLP

[57]           ABSTRACT

A display producing a display image in a vehicle width mark form and an optical path changing device directing the display image to a windshield are mounted on a base. The base is driven by an arc drive portion along an arcuate path with an arc center which is an intersection of a first imaginary sight line and a second imaginary sight line. The imaginary sight lines are reflections of a first and second actual sight lines in which a driver looks at the image position. Since the arc center conjugates the image position, when the display and the optical path changing device move along the arcuate path, the display image projecting on the windshield changes, and therefore, the image does not move up and down from the ground. Further, when a distance between the display and the optical path changing device changes, since the base moves along the arcuate path, the display distance of the image changes and the image moves along the surface of the ground.

7 Claims, 3 Drawing Sheets

DISPLAY DEVICE FOR VEHICLES

CROSS REFERENCE TO RELATED APPLICATIONS

This application is based on and claims priority of Japanese Patent Applications No. 6-130544 filed Jun. 13, 1994 and No. 6-130545 filed Jun. 13, 1994, the contents of which are incorporated herein by reference.

BACKGROUND OF THE INVENTION

1. Field of the Invention

The present invention relates to a display device for vehicles displaying an image outside a windshield glass. More particularly, it relates to a display device for assisting a vehicle driver passing through a narrow road or parking a vehicle closely to a road side.

2. Related Art

Japanese Patent Application Laid-open No. 61-249849 discloses a display device having a display emitting a vehicle width mark (an example of a display image), a lens converging the vehicle width mark as divergent light emitted by the display to parallel light, and a mirror (an example of optical path change device) directing the vehicle width mark passing through the lens to reflect toward a front windshield. Since the vehicle width mark projected on the windshield is reflected in a slightly diffused condition, the vehicle width mark (image) is displayed at an outside position (for example, 10 m ahead) being a specified distance away from the windshield.

However, positions of eye height of drivers are not fixed and the drivers have eye height varying from high to low. Since the image is formed on an extended line connecting the image reflected on the windshield with the eye position, the image moves up and down undesirably due to variations of the eye height positions of the drivers.

In order to prevent the image from moving up and down, a device disclosed in Japanese Utility Model Laid-open No. 2-33733 is known. In this device, a display device having a display and a lens is interlocked with a height adjustable tilt steering wheel. When the tilt steering wheel is held at a high position, a reflection position of a vehicle width mark projected on a windshield from the display device moves upward on the windshield. On the other hand, when the tilt steering wheel is held at a low position, the reflection position of the vehicle width mark projected on the windshield from the display moves downward on the windshield.

A rotational center of the display device is close to the windshield. In fact, when the display device rotates, the display position of the image undesirably moves up and down around the center on a point between the windshield and the image.

Further, in the display device disclosed in the Japanese Patent Application Laid-open No. 61-249849, since the speed of a vehicle is not constant and varies from low to high, drivers more often look relatively nearby when running at low speed. On the other hand, when the speed of the vehicle is high, the drivers look farther away. However, when the display position of the vehicle width mark is always fixed (10 m ahead), displaying the vehicle width mark cannot have enough effect.

In order to overcome this drawback, Japanese Patent Application Laid-open No. 60-183240 teaches another device in which a Fresnel lens converges a display image in a divergent light form emitted by a display to a parallel light form and directs the display image passing the Fresnel lens toward the windshield along an optical path of the display. Thus, by moving a position of the Fresnel lens along the optical path corresponding to the speed of the vehicle, a position where the image projected on the windshield is moved.

However, in this device, since the Fresnel lens moves along the optical path, when the display distance of the image changes, the image moves along the optical path. That is, the image does not move parallel to the surface of the ground or road, instead, the image undesirably moves up and down relative to the ground.

SUMMARY OF THE INVENTION

The present invention is made in view of the above-described drawbacks and it is an object to provide a display device for vehicles in which a position of an image does not move up and down relative to the road or ground.

Further, it is another object to provide a display device for vehicles capable of adjusting a display position of a display image reflected on a front windshield corresponding to eye height of a driver.

Moreover, it is a still another object to provide a display device for vehicles in which an image moves parallel to a surface of the ground even though a display distance of the image changes.

A display device according to the invention includes moving a display and an optical path changing device which move together along an arcuate path with a center at an intersection of a first imaginary sight line headed for and reflected on a windshield at a first reflection point and a second imaginary sight line headed for and reflected on the windshield at a second reflection point. Here, the first sight line is a reflection of a first actual sight line in which a driver having high eye height looks at the image at a specified position outside the windshield and the second imaginary sight line is a reflection of a second actual sight line in which the driver having low eye height looks at the image at the same specified position outside the windshield. The center is located below the windshield.

When the reflection position of the display image projected on the windshield is adjusted corresponding to the eye height of the driver by operating the moving device, the display moves together with the optical path changing device along the arcuate path with the center at the intersection between the first imaginary sight line and the second imaginary sight line. The display position of the image (an intersection of the first actual sight line and the second actual sight line) conjugates the intersection of the first imaginary sight line and the second imaginary sight line. Therefore, when the display and the optical path changing device move arcuately, the reflection position of the display image projected on the windshield changes with the image positioning at the display position. That is, the reflection position of the display image projected on the windshield changes with a center at the display position of the image.

Thus, when the reflection position of the display image projected on the windshield is adjusted corresponding to a position of eye height of the driver, the display distance of the image changes without the display position thereof moving up and down relative to the ground.

Alternatively, in the present invention, a display device includes an arc moving device for moving a display and an optical path changing device along an arcuate path with a center at the intersection of a first imaginary sight line headed for and reflected on the interior surface of the windshield and a second imaginary sight line headed for and reflected on the interior surface of the windshield. The first imaginary sight line is a reflection of a first actual sight line in which the driver looks at a first image set near the driver and the second imaginary sight line is a reflection of a second actual sight line in which a driver looks at a second image set farther than the first image from the driver. The center of the arcuate path is located above the windshield.

The center of the arcuate path does not have to correspond to the intersection exactly but it can deviate a little. Also, the moving trace along which the display and the optical path changing device move does not have to be in the arcuate path exactly as long as it is in an approximately arcuate shape.

DETAILED DESCRIPTION OF THE PREFERRED EMBODIMENTS

The present invention will be described in detail with reference to the accompanying drawings.

Figure 1:
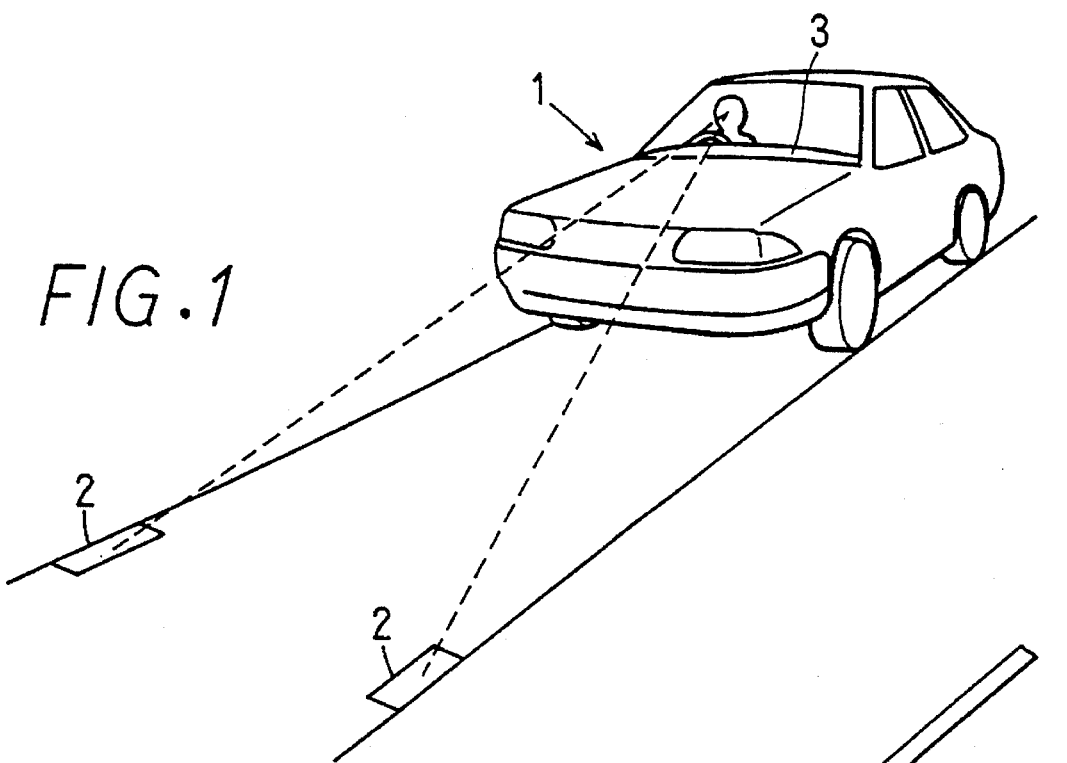
FIG. 1 is a perspective view illustrating a display condition of an image in the first embodiment of the present invention.
Figure 2:
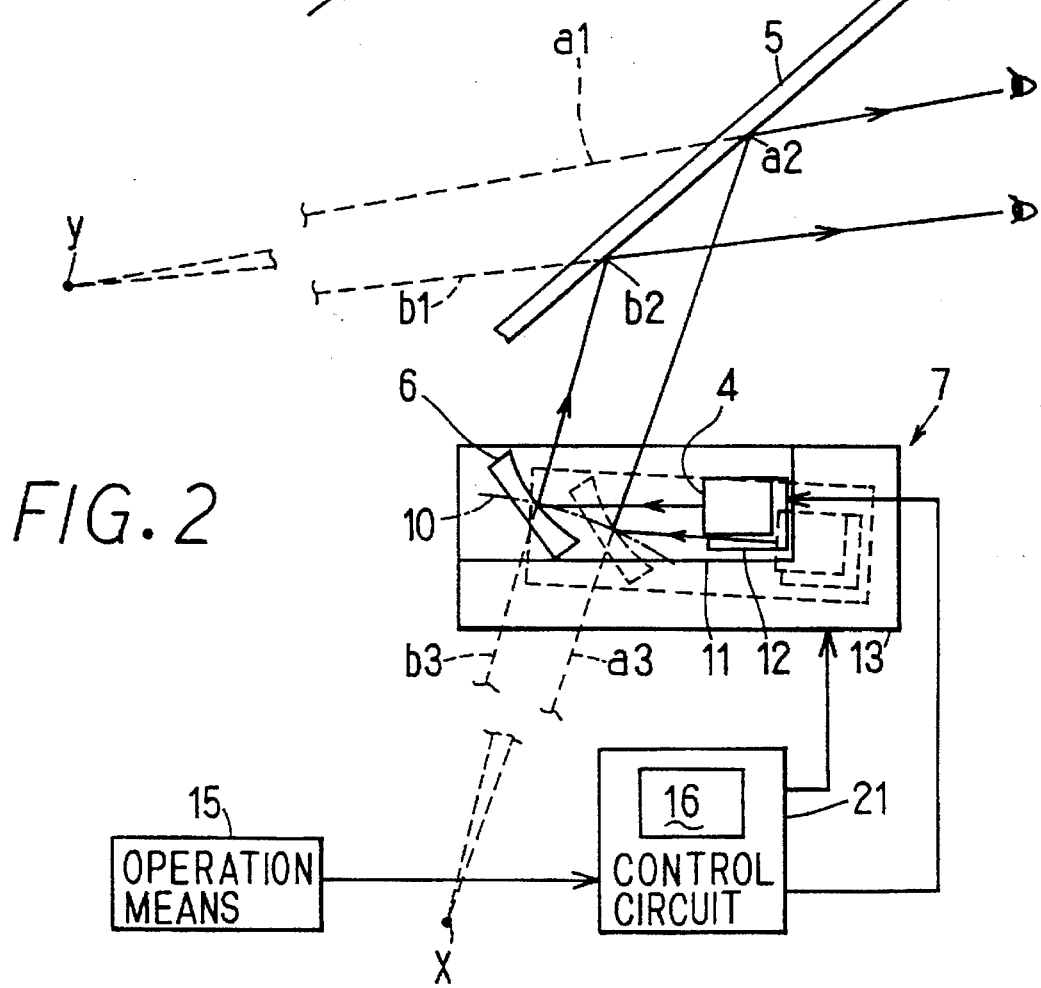
FIG. 2 is a schematic view illustrating a display device according to the first embodiment.

FIGS. 1 and 2 illustrate the first embodiment of the present invention. FIG. 1 is an explanatory view illustrating a display condition of an image and FIG. 2 is a schematic view illustrating a detailed construction of a display device for vehicles.

As shown in FIG. 1, the display device for vehicles is so designed as to reflect a vehicle width mark 2 (an image) which indicates a vehicle width at a specified position (for example, 10 m) ahead of a vehicle 1. The display device for vehicles is positioned inside a dash board 3 not to be seen by a driver or from the outside of the vehicle 1. As shown in FIG. 2, the display device includes a display 4 projecting a display image as a base of the image 2, an optical path changing device 6 directing an optical path of the display image projected and diffused from the display 4 to a front windshield 5 (a windshield glass) of the vehicle 1, and a moving device 7 for moving the display 4 and the optical path changing device 6.

The display 4 includes a light emitter (not shown in the figures) such as a lamp, a light emitting diode or the like which emits light when supplied with an electric power. Also, the display 4 includes a mark producing cell (not shown in the figures) positioned closer to the optical path changing device 6 than to the light emitter and inclined to the light produced by the light emitter. The display further includes a reflector (not shown in the figures) directing the light produced by the light emitter, at a back surface (opposite side to the mark producing cell) of the light emitter, to the mark producing cell so that the image 2 is reflected along a road surface. Further, the display 4 is covered with a case so that the light (display image) permeating the mark producing cell is not covered.

The optical path changing device 6 is a concave mirror which not only has a function of directing the display image projected from the display 4 to the front windshield 5 as described above but also has function of helping the display image emitted and diffused from the display 4 to become parallel light. Due to the above-described structure of the display 4, the display image emitted from the display 4 to the optical path changing device 6 is diffused. When the display image emitted and diffused directs to the front windshield 5 without any compensation, the image 2 is displayed onto an extremely close position ahead of the front windshield 5. Therefore, in this embodiment, the optical path changing device 6 uses the concave mirror so that the emitted and diffused display image becomes more parallel (less diffused light) and the image 2 is reflected at 10 m ahead of the vehicle 1. Alternatively, the optical path changing device 6 may use a planar mirror and a lens helping the light emitted by the light emitter become close to parallel light can be installed between the planar mirror and the light emitter.

The moving device 7 includes a base 11 on which the display 4 and the optical path changing device 6 are mounted, a distance adjusting drive portion 12 changing a distance between the optical path changing device 6 and the display 4 by driving the display 4 linearly on the base 11, an arc drive portion 13 fixed in the vehicle 1 for moving the base 11 along an arcuate path described later, a control circuit 21 controlling operations of the distance adjusting drive portion 12 and the arc drive portion 13, and an operation device 15 operated by a vehicle driver.

A trace on which the base 11 is moved along an arc (a chain-dot line 10 in FIG. 2) with a center at a point x below the windshield as shown in FIG. 2. The point x corresponds to an intersection crossing a first imaginary sight line a3 headed for and reflected to the front windshield 5 (a reflection position a2) and a second imaginary sight line b3 headed for and reflected to the front windshield 5 (a reflection position b2). The first imaginary sight line a3 corresponds to the reflection, by the front windshield 5, of a first actual sight line a1 along which the driver having high eye height looks at the image 2 at the specified position (an image display position y) outside the front windshield 5, while the second imaginary sight line b3 corresponds to the reflection, by the front windshield 5, of a second sight line b1 along which a driver having low eye height looks at the image 2 at the specified position (the image display position y) outside the front windshield. That is, the image position y conjugates the center x of the arc. The conjugated relationship is a relationship between the image and the object. Provided that the front windshield 5 is a plane, a length from the reflection position a2 to the point x is the same as a length from the reflection position a2 to the image position y. In general, however, since the front windshield 5 has a curved surface, the length from the reflection position a2 to the point x is not the same as the length from the reflection position a2 to the image position y.

The control circuit 21 comprising a computer 16 and associated electronic circuits calculates a moving amount of the display 4 against the optical path changing device 6 and a moving amount of the base 11 in response to operation conditions of the operation device 15 (a lever, a dial or a switch capable of plural settings) installed to be easily operated by the driver, and operates the distance adjusting drive portion 12 and the arc drive portion 13.

When the position of eye height of the driver is set high by the operation device 15, the arc drive portion 13 moves the base 11 to a rearward direction of the vehicle 1 along the arc 10 with the center at the point x. The projection position a2 of the display image directed to the front windshield 5 from the optical path changing device 6 moves upward of the front windshield 5. At that time, in order to prevent changing in optical path length between the drivers eyes and the optical path changing device 6, the distance between the display 4 and the optical path changing device 6 also is adjusting by the distance adjusted drive portion 12.

On the other hand, when the position of eye height of the driver is set low by the operation device 15, the arc drive portion moves the base 11 in the forward direction of the vehicle 1 along the arc 10. The projection position b2 of the display image directed to the front windshield 5 from the optical path changing device 6 moves downward on the front windshield 5. At that time, in order to prevent a change in optical path length between the driver and the optical path changing device 6, the distance between the display 4 and the optical path changing device 6 also is adjusted by the distance adjusting drive portion 12.

Next, operations of the first embodiment will be explained.

When displaying the image 2 indicative of the vehicle width ahead of the vehicle 1 to be viewed upon passing through a narrow road or the like, the display image 2 emitted by the display 4 is directed to the front windshield 5 by the optical path changing device 6 and the display image is projected on the front windshield. Since the display image projected to the front windshield 5 is less diffused light and adjusted to indicate 10 m position ahead of the vehicle 1, a driver can see the image 2 showing the vehicle width at 10 m ahead of the vehicle 1.

Provided that the image 2 is hard to be seen due to changes of drivers' eye heights when drivers take turns, the operation device 15 is operated. When the operation device 15 is operated, the control circuit 21 controls the distance adjusting drive portion 12 and the arc drive portion 13 corresponding to the operation condition of the operation device 15. Thus, the base 11 is moved along the arc with the point x as the center of the arc so that the position of the display image projecting to the front windshield 5 changes up and down. The length between the display 4 and the optical path changing device 6 is changed also so as not to change the optical path length from the display 4 and the driver's eyes. The driver adjusts further the operation device 15 so that the image 2 comes to the most appropriate position to be seen.

As described in the operation of the first embodiment, since the display 4 and the optical path changing device 6 move along the arc 10 around the point x as the center conjugating the image position y, the projection position of the display image emitted to the front windshield 5 changes with the image 2 being kept at the specified display position. That is, the projection position of the display image on the front windshield 5 changes around the display position of the image 2 as the center. As a result, when the projection position of the display image projected to the front windshield 5 is adjusted corresponding to the eye height position of the driver, the image 2 can be adjusted without the display position of the image 2 moving up and down. When the display image projected to the front windshield 5 is moved up and down by way of the operation device 15, since the distance between the display 4 and the optical path changing device 6 is adjusted also so that a distance between the optical path changing device 6 and eyes of the driver does not change, the image 2 can be provided at the specified position accurately.

Although, in the first embodiment, the point x as the center of the arc corresponds to the intersection of the first imaginary sight line a3 and the second imaginary sight line b3, the center point x of the arc may deviate a little from the intersection. That is, for example, the deviation between the center x of the arc and the intersection is preferably ranged within 1/10 of the distance between the front windshield 5 and the display position y of the image 2.

Although the distance between the display 4 and the optical path changing device 6 is adjusted by using the distance adjusting drive portion 12, since the distance between the display 4 and the optical path changing device 6 adjusted by the distance driving drive portion 12 is short, the display 4 can be fixed to the base 11. Further, although the moving trace of the display 4 and the optical path changing device 6 moves along the arc 10 with the point x as the center thereof, the trace does not necessarily have to correspond to the arc having the point x as the center. For example, when the distance between the point x and the optical path changing device 6 is long as in the first embodiment, it is only necessary that the trace can closely resemble the arc having the point x as the center thereof. Therefore, for example, the display 4 and the optical path changing device 6 can move on a straight line in the arc direction. Although the image 2 is displayed to indicate vehicle width, the image 2 may be displayed for determining an allowable distance to a preceding vehicle, for determining pulling over a vehicle or for operating a display of a vehicle longitudinal length helping a column parking or the like. Further, other information can be displayed by the image 2. Moreover, although the display image is projected from the optical path changing device 6 to the front windshield 5 to be seen by the driver instead of the front windshield glass like the front windshield 5 of the embodiment, the display light from the optical path changing device 6 can be projected to a special light permeating reflection plate for displaying the image 2 in such a manner that the image light is transmitted through and reflected by a special plate.

Next, the second embodiment of the invention will be explained with reference to FIGS. 3 and 4.

Figure 3:
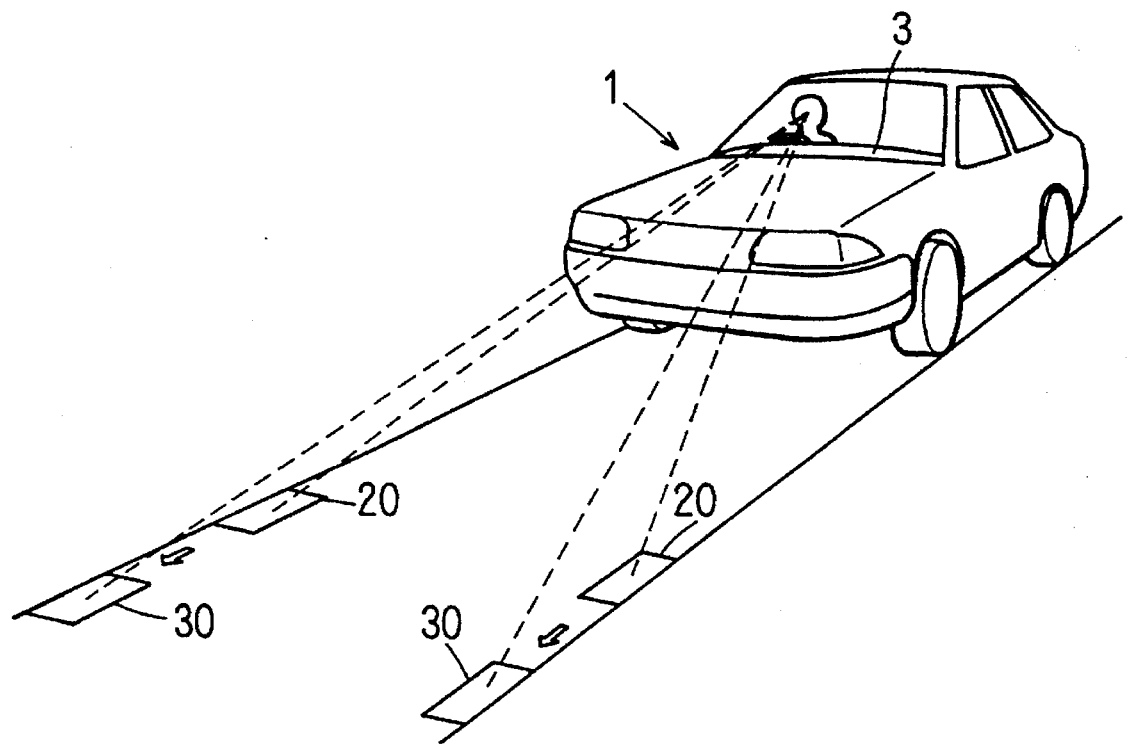
FIG. 3 is a perspective view illustrating a display condition of an image in the second embodiment of the present invention.

As shown in FIG. 3, a display device for vehicles is designed to reflect a vehicle width mark (an image) which indicates a vehicle width and to change a display distance of the vehicle width mark corresponding to a vehicle speed. When the vehicle speed is low, the vehicle width mark displayed at a position close to a driver is referred to as a first image 20, and when the vehicle speed is high, the vehicle width mark displayed at a position further from the driver is referred to as a second image 30. The vehicle width mark changing from the first image 20 to the second image 30 is set to be provided along the surface of the ground.

The display device for vehicles is installed inside a dash board 3 not to be seen by the driver or from the outside of the vehicle 1. As shown in FIG. 4, the display device comprises a display 4 projecting the display image as a base of an image 2, an optical path changing device 6 directing an optical path of the display image projected and diffused from the display 4 to a front windshield 5 (a windshield glass) of 5 the vehicle 1 and a drive device moving the display 4 and the optical path changing device 6. The drive device, as described later, comprises a distance changing device 8 changing a distance between the display 4 and the optical path changing device 6 by moving the display 4 and an arc moving device 9 moving the display 4 and the optical path changing device 6 along an arcuate path 10'.

The display 4 comprises a light emitter (not shown in the figures) such as a lamp, a light emitting diode or the like which emits light of the display image when supplied with an electric power. Also, the display 4 comprises a mark producing cell (not shown in the figures) positioned closer to the optical path changing device 6 than to the light emitter and inclined to the light produced by the light emitter. The display further comprises a reflector (not shown in the figures) directing the light produced by the light emitter, at a back surface (opposite side to the mark producing cell) of the light emitter, to the mark producing cell so that the vehicle width mark is projected. Further, the display 4 is covered with a case so that the light (display image) permeating the mark producing cell is not covered.

The optical path changing device 6 is a concave mirror which not only has a function of directing the display image projected from the display 4 to the front windshield 5 as described above but also has function of helping the display image emitted and diffused from the display 4 to become a parallel light. Due to the above-described structure of the display 4, the display image emitted from the display 4 to the optical path changing device 6 is diffused. When the display image emitted and diffused is directed to the front windshield 5 without any compensation, the vehicle width mark is displayed onto an extremely close position ahead of the front windshield 5. Therefore, in this embodiment, the optical path changing device 6 uses the concave mirror so that emitted and diffused display image becomes more parallel (less diffused light) and the vehicle width mark is reflected at 10 m ahead of the vehicle 1. Alternatively, the optical path changing device 6 may use a planar mirror, and a lens which causes the light emitted by the light emitter to become parallel light can be installed between the planar mirror and the light emitter.

As described above, the drive device comprises the distance changing device 8 changing the distance between the display 4 and the optical path changing device 6 by moving the display 4 and the arc changing device 9 moving along the arc with the display 4 and the optical path changing device 6, and both are operated by a control circuit 21.

The distance changing device 8 drives the display 4 linearly and comprises a distance changing drive portion 12 changing the distance between the optical path changing device 6 and the display 4. The arc moving device 9 moves the display 4 and the optical path changing device 6 without changing an angle connecting an emitting point of the emitter, a reflection point of the optical path changing device 6 and a reflection point of the front windshield 5. Further, the arc moving device 9 comprises the base 11 on which the display 4 assembled through the distance changing drive portion 12 and the optical path changing device 6 are assembled and an arc drive portion 14 which the base 11 is fixed on the vehicle 1 moving along the arc described later.

Figure 4:
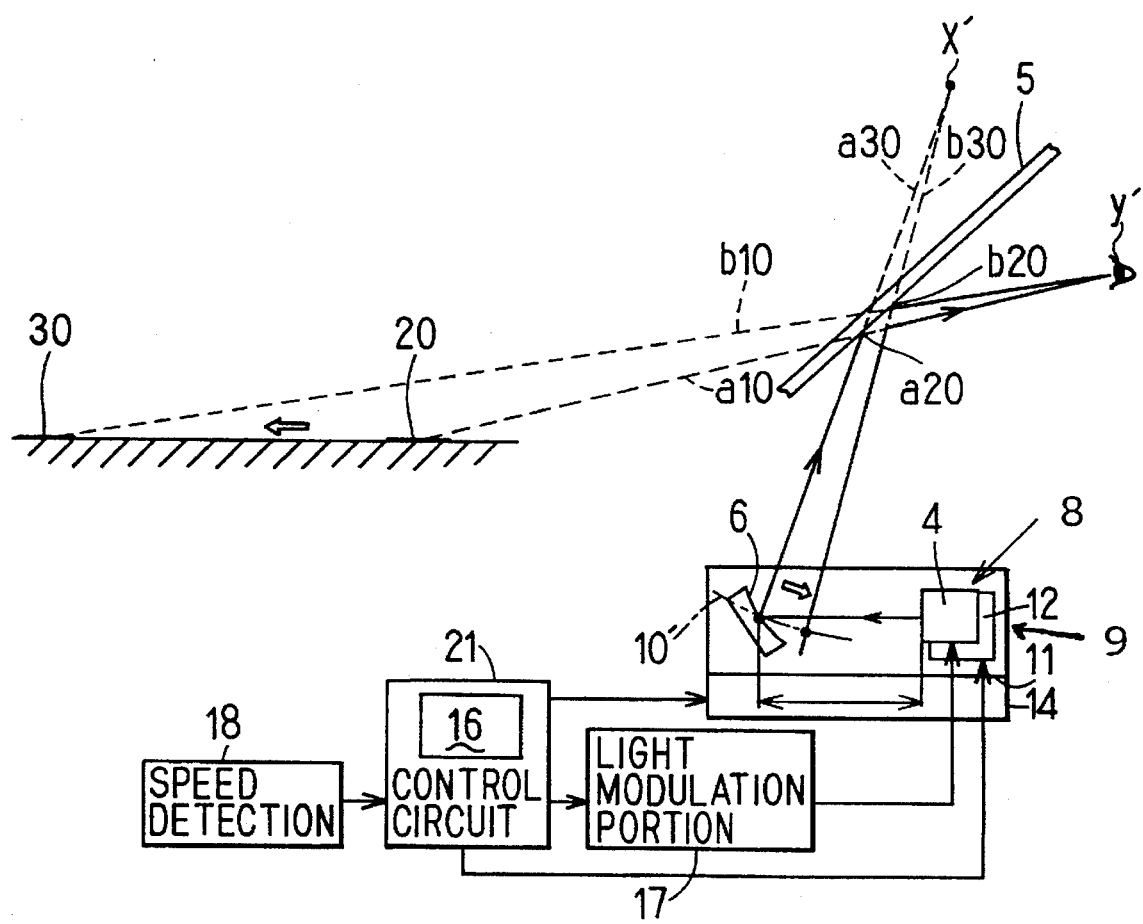
FIG. 4 is a schematic view illustrating a display device according to the second embodiment.

A trace on which the base 11 is moved moves along an arcuate path 10'(a dotted line in FIG. 4) with a center at a point x' which is above the windshield 5 as shown in FIG. 4. The point x' corresponds to an intersection at which crosses a first imaginary sight line a30 headed for and reflected at the front windshield 5 (reflection position a20) and a second imaginary sight line b30 headed for and reflected at the front windshield 5 (a reflection position b20). The first imaginary sight line a30 corresponds to the reflection, by the front windshield 5, of a first actual sight line a10 in which the driver having an eye position y' looks at the image 20 at the specified position outside the front windshield 5, while the second imaginary sight line b30 corresponds to the reflection, by the front windshield 5, of a second actual sight line b10 in which the driver looks at the image 30 at another specified position outside the front windshield 5. That is, the eye position y' conjugates the center x' of the arcuate path. The conjugated relationship is a relationship between the eye position and the object. Provided that the front windshield 5 is a plane, a length from the reflection position a20 to the point x' is the same as a length from the reflection position a20 to the eye position y'. In general, however, since the front windshield 5 has a curved surface, the length from the reflection position a20 to the point x' is not the same as the length from the reflection position a20 to the eye position y'.

The control circuit 21 comprises a computer 16. Based on detected speed of a speed detecting device 18 detecting vehicle speed, the control circuit 21 calculates a moving amount of the display 4 against the optical path changing device 6 and a moving amount of the base 11 and operates the distance changing drive portion 12 and the arc drive portion 14 simultaneously. Further, the control circuit 21 controls a light adjusting portion 17 which changes an amount of conducted electricity of the emitter of the display 4 so that the brightness of the image is valid. The more the detected speed of the vehicle speed detecting device 18 increases, the more the amount of conducted electricity of the emitter is reduced.

Next, the operation of the embodiment will be explained with the operation of the control circuit 21.

When the vehicle width mark is used to display the vehicle width ahead of the vehicle 1 upon passing through the narrow road or the like, the display image emitted by the display 4 is directed to the front windshield 5 by the optical path changing device 6 and the display image is projected on the front windshield 5.

When the vehicle speed detected by the speed detecting device 18 is low, the display 4 is moved close to the optical path changing device 6 by the distance changing drive portion 12. The vehicle width mark is displayed at the position close to the driver and the base 11 is moved ahead in the vehicle 1 along the arc by the arc drive portion 14. Moreover, the projection position a20 of the display image directed from the optical path changing device 6 to the front windshield 5 is moved to be on the first actual sight line a10 connecting the first image 20 and the position y' of eyes of the driver. By the operation of the distance changing drive portion 12 and the operation of the arc drive portion 14, the first image 20 is formed to correspond to the road surface position close to the driver. Since electric power to the light emitter by the light adjusting portion 17 is large when the speed is low, the first image 20 is displayed clearly at the portion close to the driver, and driving the vehicle through the narrow road at low speed is eased.

When the speed detected by the speed detecting device 18 is high, the display 4 is moved away from the optical path changing device 6 by the distance changing drive portion 12 and the vehicle width mark is displayed at a position away from the driver. The base 11 is moved in the rear direction in the vehicle 1 along the arc by the arc drive portion 14 and the projection position of the display image directed by the optical path changing device 6 to the front windshield 5 is moved to be on the sight line b10 connecting the second image 30 and the position y' of eyes of the driver. By the operation of the distance changing drive portion 12 and the operation of the arc drive portion 14, the second image 30 is formed to correspond to the road surface position away from the driver. Since the electric power to the light emitter by the light adjusting portion 17 is small when the speed is high, visibility of the second image 30 displayed away from the driver is decreased, and therefore, the second image 30 is prevented from becoming an obstacle to the driver while driving.

As explained above, when the display 4 moves and the distance between the display 4 and the optical path changing device 6 changes, since both the display 4 and the optical path changing device 6 move along the arc with its center point x' conjugating the position y' of eyes of the driver, the display position of the vehicle width mark from the vehicle changes with the vehicle width mark moving along the surface of the ground. That is, the display position of the vehicle width mark changes without the vehicle width mark moving up and down against the surface of the ground.

In the above-described embodiment, the point x' of the arc center corresponds to the intersection of the first imaginary sight line a30 and the second imaginary sight line b30, however, the point x' does not have to correspond thereto exactly. Although the display 4 and the optical path changing device 6 moves along the arc having the point x' as the center, the moving trace does not have to correspond to the arc having the point x' as the center thereof exactly. For example, when the distance between the point x' and the optical path changing device 6 is long as in the embodiment, the trace can be close to the arc and, for example, the display 4 and the optical path changing device 6 can be moved on the straight line in the arc direction. Although the vehicle width is displayed by the image, other information can be displayed by the image.

Although the display image projected by the optical path changing device 6 is directed on the front windshield 5 so that the display image is displayed to the driver, instead of a windshield glass such as the front windshield 5 or the like, the display light directed by the optical path changing device 6 can be projected on a special translucent reflecting plate for the vehicle width mark display so that the light reflects thereon and permeates therethrough.

The display distance of the image is changed corresponding to the speed of the vehicle in the second embodiment, however, the display distance of the image can be changed by the operation of the driver. When the vehicle speed is high, the brightness of the image is decreased so that the clearness of the image is decreased. However, when the speed is more than a specified speed, the electric power to the light emitter may be stopped so that the display of the image can be stopped.

Figure 5:
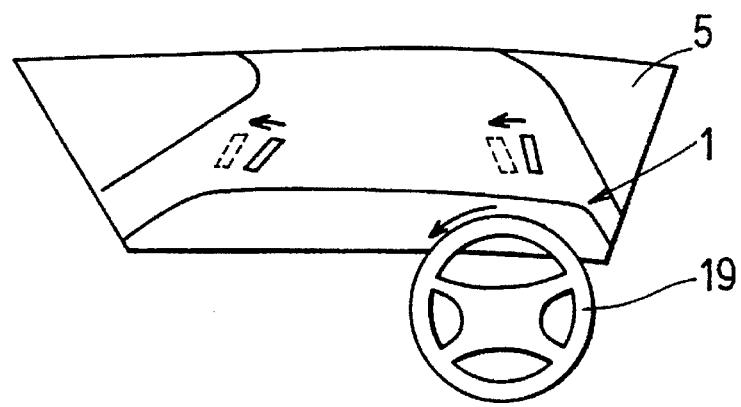
FIG. 5 is a schematic view illustrating a modification of the display condition of the image in the second embodiment.

The display position of the image can be changed in right and left directions or in slope corresponding to a rotating angle of a steering wheel. For example, a rotation detecting sensor detecting the rotating angle of the steering wheel and a rotation drive portion for rotating the base 11 in a horizontal direction based on the detected value of the rotation detecting sensor may be installed so that, as shown in FIG. 5, the display position of the image can be changed in left and right directions corresponding to the rotating angle of the steering wheel 19.

When the image is sloped against the surface of the ground as in the case that the image is displayed along the surface of the ground as the vehicle width mark in the embodiments, the slope of the image is changed against the surface of the ground as the display distance thereof changes. Thus, a sloping angle of the cell (mark producing cell) of the display 4 producing the display image may be changed by a sloping angle changing device in correspondence to the display distance of the image.

The present invention should not be limited to the foregoing embodiments but may be modified in many other ways without departing from the spirit of the present invention.

What is claimed is:

1. A display device for vehicles comprising:
a display projecting a display image;
optical path changing device directing said display image projected by said display to be formed on a transparent screen;
distance adjusting device adjusting a distance between said display and said optical path changing device;
position adjusting device adjusting a position of said optical path changing device; and
control device controlling said distance adjusting device and said position adjusting device so that adjusting operations of said adjusting device are interrelated;
wherein said control device moves said two adjusting device along an arcuate path so that said display image indicates the same outside position ahead of a windshield, irrespective of a height of eyes of a driver.

2. The display device according to claim 1, wherein said control device moves said position adjusting device along the arcuate path having a center at an intersection of a first and second imaginary lines which are extensions of said optical path from said optical path changing device when said display image is directed to a first position and a second position of said transparent screen, respectively.

3. A display device for vehicles comprising:
a display projecting a display image;
optical path changing device directing an optical path of said display image projected by said display image to a vehicle windshield;
distance changing device changing a distance between said display and said optical path changing device so that said image is displayed to a driver at an outside position away from said windshield and the position of said display image displayed outside said windshield is changed by changing said distance between said display and said optical path changing means; and
arc moving device moving said display and said optical path changing device along an arcuate path having an arc center at an intersection of a first imaginary sight line reflected on and headed for said windshield and a second imaginary sight line reflected on and headed for said windshield, said first imaginary sight line being a reflection, at said windshield, of a first actual sight line in which said driver looks at said display image at a first position close to said windshield, said second imaginary sight line being a reflection, at said windshield, of a second actual sight line in which said driver looks at said display image at a second position away from said windshield, said arc center being located above said windshield.

4. The display device for vehicles according to claim 3, wherein said windshield includes a permeating reflection plate which passes and reflects light of said display image directed from said optical path changing device.

5. The display device for vehicles according to claim 3, wherein said display is moved away from said optical path changing means as a vehicle speed increases and closer to said optical path changing means as said vehicle speed decreases.

6. A display device for vehicles comprising:
a display projecting a display image;
optical path changing means directing said display image projected by said display to be formed on a transparent screen;
distance adjusting means adjusting a distance between said display and said optical path changing means;

position adjusting means adjusting a position of said optical path changing means; and control device controlling said distance adjusting means and said position adjusting means so that adjusting operations of said adjusting means are interrelated;

wherein said control means moves said two adjusting means along an arcuate path so that said display image indicates different outside positions ahead of a windshield depending on a vehicle speed.

7. The display device according to claim 6, wherein said control means controls slope angle of said display image depending on a rotating angle of a steering wheel of a vehicle.

* * * * *